United States Patent
Kim et al.

(10) Patent No.: US 8,942,873 B2
(45) Date of Patent: Jan. 27, 2015

(54) SAFETY CONTROL SYSTEM AND METHOD FOR HYDROGEN CHARGING OF FUEL-CELL VEHICLE

(71) Applicants: Hyundai Motor Company, Seoul (KR); Kia Motors Corporation, Seoul (KR)

(72) Inventors: Hyung Ki Kim, Seoul (KR); Ki Ho Hwang, Seoul (KR); Sang Hyun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 216 days.

(21) Appl. No.: 13/687,966

(22) Filed: Nov. 28, 2012

(65) Prior Publication Data

US 2014/0095055 A1 Apr. 3, 2014

(30) Foreign Application Priority Data

Sep. 28, 2012 (KR) .......................... 10-2012-0108668

(51) Int. Cl.
*H02J 7/00* (2006.01)
*B60W 10/24* (2006.01)

(52) U.S. Cl.
USPC .............................. 701/22; 701/112; 320/155

(58) Field of Classification Search
USPC .................. 701/22, 112, 1; 180/65.21, 65.27; 320/155–158, 107
See application file for complete search history.

(56) References Cited

U.S. PATENT DOCUMENTS

| 8,393,423 | B2 * | 3/2013 | Gwozdek et al. .......... 180/65.27 |
| 8,499,547 | B2 * | 8/2013 | Mitsutani ........................ 60/284 |
| 8,615,343 | B2 * | 12/2013 | Aldighieri et al. .............. 701/22 |

FOREIGN PATENT DOCUMENTS

| JP | 2008167652 A | 7/2008 |
| JP | 2011072104 A | 4/2011 |
| KR | 10-1998-0020260 A | 6/1998 |
| KR | 10-2002-0051427 | 6/2002 |
| KR | 10-2003-0046961 | 6/2003 |
| KR | 10-2009-0108768 | 10/2009 |
| KR | 10-2009-0114842 | 11/2009 |

* cited by examiner

*Primary Examiner* — Tan Q Nguyen
(74) *Attorney, Agent, or Firm* — Edwards Wildman Palmer LLP; Peter F. Corless

(57) ABSTRACT

Disclosed is charging safety control system for a fuel-cell vehicle. In particular, a charging switch is provided in a fuel-cell vehicle to be manipulated in hydrogen charging as well as a vehicle speed detector for detecting a current vehicle speed. A controller within the vehicle is configured to receiving a signal corresponding to on/off-manipulation of the charging switch and a detected current vehicle speed and control the ignition of the vehicle based thereon. Particularly, the controller is configured to switch off the ignition of the vehicle upon receiving the on-manipulation signal of the charging switch, and upon determining that the vehicle is stopped based on the current vehicle speed.

12 Claims, 2 Drawing Sheets

SAFETY CONTROL SYSTEM AND METHOD FOR HYDROGEN CHARGING OF FUEL-CELL VEHICLE

CROSS-REFERENCE TO RELATED APPLICATION

This application claims under 35 U.S.C. §119(a) the benefit of Korean Patent Application No. 10-2012-0108668 filed on Sep. 28, 2012, the entire contents of which are incorporated herein by reference.

BACKGROUND (a) Technical Field

The present invention relates to a fuel-cell vehicle, and more particularly, to a safety control system and method for hydrogen charging of a fuel-cell vehicle, which can improve safety of the fuel-cell vehicle during hydrogen charging by turning off the ignition of the fuel-cell vehicle during hydrogen charging of the fuel-cell vehicle.

(b) Background Art

Unlike an internal-combustion engine vehicle driven using rotational power of the internal-combustion engine, which is generated by explosive power obtained via combustion of fossil fuel and oxygen in the air, a fuel-cell vehicle is driven by utilizing rotational power of an electric motor driven via electric energy generated in a fuel-cell stack. The fuel-cell stack, which is a main power source of the fuel-cell vehicle, generates electric energy through an electrochemical reaction between hydrogen supplied by a hydrogen supplier including a hydrogen tank or a reformer in the vehicle and oxygen in the air supplied by an air supplier such as a blower or a compressor. Therefore, in the fuel-cell vehicle, it is important to store hydrogen, which is a type of fuel or gas, in a safe and compact manner. To this end, various hydrogen storing techniques have been developed which achieve both an increase in the traveling distance of the vehicle and safety of the vehicle.

Among those techniques, hydrogen may be stored as liquid hydrogen in the vehicle or may be occluded in an occlusion alloy, but such a scheme has a problem which cannot be solved by current techniques in terms of natural evaporation or sorption quantity. As a result, hydrogen is generally charged and used in a hydrogen tank which has a light weight and high strength and can endure high pressure. To secure a sufficient cabin space and a sufficient traveling distance, a hydrogen tank capable of filling hydrogen therein with high pressure, such as 350 bar or 700 bar, is widely used.

In the case of a general gasoline vehicle or diesel vehicle, there are often no regulations or laws that require the ignition to be off or that prevent the driver from turning the ignition on while the fuel is being pumped into the gas tank even though it is highly recommend drivers turn off the ignition while pumping gas for safety reasons.

For a fuel-cell vehicle, however, laws and regulations that restrict operation of a propulsion system and vehicle movement during fuel charging have in fact been enacted. As a result, ignition control logic that would normally be applied to a gasoline vehicle or diesel vehicle can not be applied to a fuel cell vehicle while still abiding by the new laws and regulations.

In particular, conventionally, when the ignition of the fuel-cell vehicle is controlled, a device for sensing fuel charging has not included, and as a result vehicle ignition cannot be restricted systematically during fuel charging and thus the law and regulations may be violated in the process.

As such, the fuel-cell vehicle should satisfy the related laws and regulations that prescribe that during the progress of fuel charging, the propulsion system of the fuel-cell vehicle can not be operated and movement of the vehicle is not be allowed. However, logic for sensing the progress of hydrogen charging has currently not been applied to a conventional fuel-cell vehicle, thus failing to satisfy the related laws and regulations.

SUMMARY OF THE DISCLOSURE

Accordingly, the present invention has been made to solve the foregoing problem, and provides a charging safety control system and method for a fuel-cell vehicle, in which during hydrogen charging of the fuel-cell vehicle, the ignition of the vehicle is switched off to improve safety of the vehicle which is being charged with hydrogen.

According to an aspect of the present invention, there is provided a charging safety control system for a fuel-cell vehicle, the charging safety control system including a charging switch provided in the fuel-cell vehicle to be manipulated during hydrogen charging, a vehicle speed detector configured to detect a current vehicle speed, and a controller (including a processor and memory) configured to receive a signal corresponding to on/off-manipulation of the charging switch and the current vehicle speed detected by the vehicle speed detector and control the ignition of the vehicle, in which the controller switches off the ignition of the vehicle, when the controller, upon receiving the on-manipulation signal of the charging switch, determines that the vehicle is in a stopped state based on the current vehicle speed detected by the vehicle speed detector.

The charging safety control system may further include a communication means provided in the fuel-cell vehicle to achieve communication between the controller and a charging-station side controller, in which the controller is configured to transmit a charging stop signal to the charging-station side controller via the communication network, when the controller of the fuel-cell vehicle determines from the current vehicle speed detected by the vehicle speed detector that the vehicle is in a stopped state while the charging switch is off.

The charging safety control system may further include a tank pressure detector provided on the fuel-cell vehicle to detect a pressure within a hydrogen tank, in which the controller of the fuel-cell vehicle is configured to switch off the ignition of the vehicle, when the controller, after transmitting the charging stop signal, determines from the pressure of the hydrogen tank detected by the tank pressure detector that a pressure change within the hydrogen tank has exceeded a predetermined reference value.

According to another aspect of the present invention, there is provided a charging safety control method for a fuel-cell vehicle, the charging safety control method including manipulating a charging switch to an on-state to charge a hydrogen tank with hydrogen in the fuel-cell vehicle, and receiving, by a controller, an on-manipulation signal from the charging switch and a detection signal from a vehicle speed detector detecting a current vehicle speed of the vehicle, and switching off, by the controller, the ignition of the vehicle in response to determining that the vehicle is currently in a stop state based on the current vehicle speed.

The controller may be configured to transmit a charging stop signal to a charging-station side controller via a communication means in the vehicle in response to determining based on received vehicle speed, that the vehicle is currently in the stop state and charging switch is off.

The controller may be configured to switch off the ignition of the vehicle, when, upon transmitting the charging stop signal, the controller receives a detection signal from a tank pressure detector detecting a pressure of the hydrogen tank and determine whether a pressure change exceeds a predetermined reference value in the hydrogen tank.

The controller may be also be configured to switch on the re-ignition of the vehicle according to vehicle ignition manipulation of a driver upon receiving the off-manipulation signal of the charging switch after switching off the ignition of the vehicle while in the stop state of the vehicle, and may be configured to prohibit switching on the ignition of the vehicle when the on-manipulation state of the charging switch is maintained.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION

Hereinafter, the present invention will be described in detail with reference to the accompanying drawings to allow those of ordinary skill in the art to easily carry out the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor fuel cell vehicles in general such as passenger automobiles including sports utility vehicles (SUV), buses, trucks, various commercial vehicles, watercraft including a variety of boats and ships, aircraft, and the like, and includes hybrid fuel cell vehicles, electric fuel cell vehicles, plug-in hybrid electric fuel cell vehicles, hydrogen-powered fuel cell vehicles and other alternative fuel cell vehicles. As referred to herein, a hybrid vehicle is a vehicle that has two or more sources of power, for example both fuel cell-powered and electric/gas powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
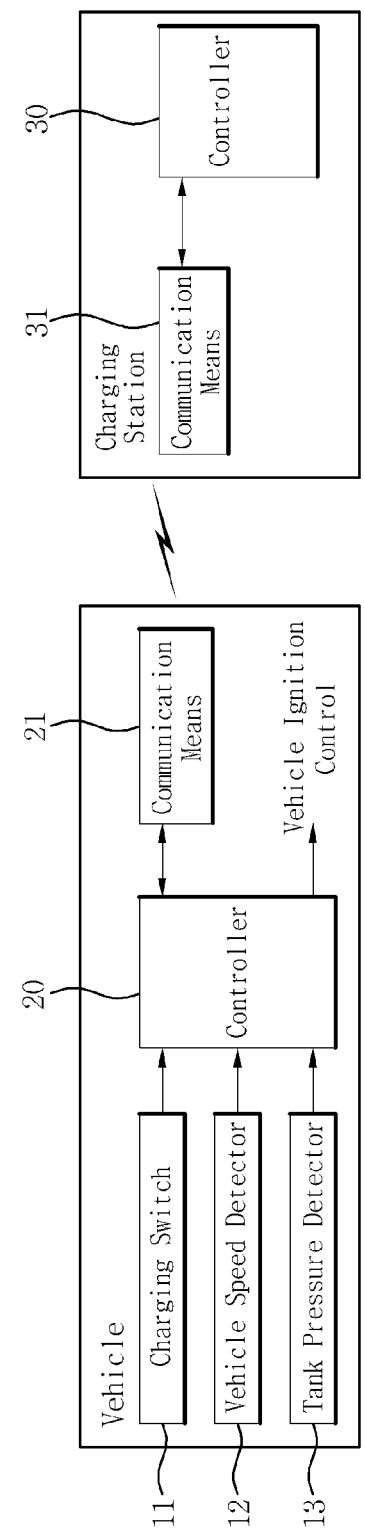
FIG. 1 is a block diagram of a charging safety control system according to an exemplary embodiment of the present invention.
Figure 2:
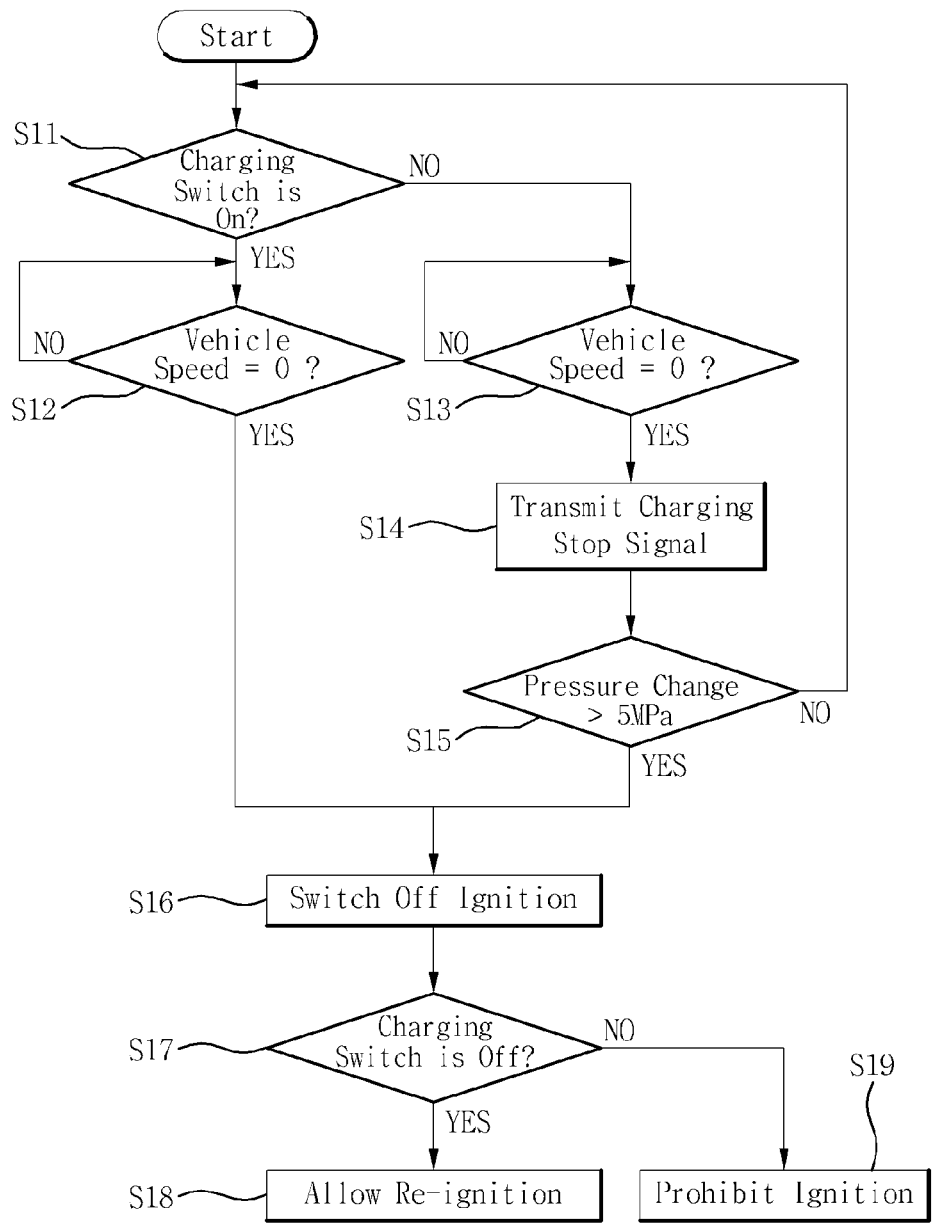
FIG. 2 is a flowchart of a charging safety control method according to an exemplary embodiment of the present invention.

FIG. 1 is a block diagram of a charging safety control system according to the present invention, and FIG. 2 is a flowchart of a charging safety control method according to the present invention. The charging safety control system according to the exemplary embodiment of the present invention may include a charging switch 11 which is manipulated by a driver for hydrogen charging of a fuel-cell vehicle. That is, when hydrogen is being charged in the fuel-cell vehicle, the charging switch 11 manipulated by the driver is installed around a driver's seat inside the vehicle, should be switched on by the driver. More specifically, the charging switch 11 may be installed in a position which allows easy manipulation of the driver, such as dashboard, inside the vehicle.

In the present invention, the charging switch 11 may also be installed in a position which allows easy manipulation of the driver around the driver's seat inside the vehicle, e.g., a cluster or center fascia, an inner side of a door, a tray between the driver's seat and a passenger seat, or a console box, as well as the dashboard. Since the driver manipulates the charging switch 11 when charging hydrogen, it should be installed in a position which allows driver's easy manipulation inside the vehicle.

Considering that the charging switch 11 must be manipulated for hydrogen charging, the charging switch 11 may be installed outside the vehicle, such as inside a fuel door of a fuel filler of the vehicle, and in this case, the driver or a person who charges hydrogen (a person who injects a fuel, which corresponds to a filling-station attendant for a gasoline vehicle or a diesel vehicle) manipulates the charging switch 11 when the fuel door is opened, much like a common refrigerator light switch.

In the following description, it is assumed that a state where the charging switch 11 is manipulated to charge a fuel, e.g., hydrogen, will be referred to as an on-state; and a state where the charging switch 11 is not manipulated prior to charging of hydrogen after driving of the vehicle, or when the charging switch 11 in the on-state is further manipulated to release the on-state will be referred to as an off-state.

Regardless, the on/off-state of the charging switch 11 may be recognized by a controller 20 of the vehicle through an input switch manipulation signal. The controller 20 of the vehicle is in charge of ignition control of the vehicle, and controls ignition of the vehicle according to the manipulation state (on/off-state) of the charging switch 11 as will be described below. That is, the controller 20 determines, based on the on/off-state of the charging switch 11, whether the vehicle is being charged with hydrogen or the vehicle is not being charged with hydrogen, and when the charging switch 11 is on and during hydrogen charging, the controller 20 controls the vehicle to be ignition-switched off.

For example, in the on-state of the charging switch 11 and during hydrogen charging, when the ignition of the vehicle is in the switched-on-state, the controller 20 switches off the ignition of the vehicle, and prevents the ignition of the vehicle from being turned back on until the charging switch 11 is manipulated to the off-state. On the other hand, when the charging switch 11 is off, the controller 20 does not perform a separate control operation. When the vehicle is moving (vehicle speed>0), normal vehicle operation is achieved while the charging switch 11 is off.

When the vehicle is stopped (vehicle speed=0) and the charging switch 11 is off, the possibility of hydrogen charging is assumed, such that a charging stop signal may be transmitted to a charging station via a communication means 21 not to allow hydrogen charging even when charging manipulation is performed. Thus, when hydrogen charging is performed in spite of transmission of the charging stop signal to the charging station even when the driver does not turn on the charging switch 11, that is, when the charging switch 11 is off, then the controller 20 automatically switches off the ignition of the vehicle.

In the present invention, switching off the ignition of the switch by the controller 20 during hydrogen charging includes a shut-down state of a fuel-cell system and means an ignition-off-state such as in key-off-manipulation in a fuel-cell vehicle. However, even when the ignition of the vehicle is switched off due to the on-state of the charging switch and hydrogen charging, power supplied to the controller 20 is maintained.

While the controller 20 is described as a single integrated controller included in the vehicle side in the present invention, the vehicle-side controller 20 may be implemented with a plurality of controllers such as a fuel-cell system controller and a hydrogen storage system controller, and a control process of the present invention is achieved by the assistance of those controllers, which as described above have a processor and a memory.

The charging safety control system according to the present invention may include a vehicle speed detector 12 provided in the fuel-cell vehicle to detect the current vehicle speed and a tank pressure detector 13 that is configured to detect a pressure of a hydrogen tank, and the vehicle-side communication means 21 for communication between the vehicle-side controller 20 in the fuel-cell vehicle, and may further include a charging station-side controller 30, especially, for transmitting a charging stop signal output from the vehicle-side controller 20 to the charging station-side controller 30 via a charging station-side communication means 31.

Herein, the vehicle speed detector 12 may be a wheel speed sensor such as in a conventional vehicle, and the controller 20 may be configured to receive a signal from the wheel speed sensor which may be used to calculate the current vehicle speed and use the calculated current vehicle speed as a parameter for vehicle ignition control.

The tank pressure detector 13 may be a pressure sensor installed in a hydrogen tank in a general fuel-cell vehicle, and the controller 20 may be configured to receive a signal from the tank pressure detector 13 and controls the ignition of the vehicle based on the pressure state of the hydrogen tank.

The communication means 21 may be a wired or wireless communication means which may be an Infrared (IR) communication module provided in a general fuel-cell vehicle for communication with the charging-station side controller 30.

In the present invention, when the controller 20 is implemented with a fuel-cell system controller for controlling the ignition of the vehicle and a hydrogen-storage system controller for controlling hydrogen charging of the vehicle, rather than a single integrated controller, then an on/off-manipulation signal of the charging switch 11 and the detection signal of the vehicle speed detector 12 are received by the fuel-cell system controller which then controls ignition of the vehicle based on the received signals.

The on/off-manipulation signal of the charging switch 11 is also input to the hydrogen storage system controller, and the signal of the tank pressure detector 13 is input to the hydrogen storage system controller, but since the pressure state of the hydrogen tank also involves the ignition of the vehicle, the pressure information of the hydrogen tank detected by the tank pressure detector 13 may also delivered to the fuel-cell system controller. Upon determining that the pressure change exceeds a reference value in the hydrogen tank of the vehicle based on the pressure information from the hydrogen tank, the fuel-cell system controller switches off the ignition of the vehicle.

The detection signal of the vehicle speed detector 12 is input to the fuel-cell system controller, and may also be directly input to the hydrogen storage system controller or may be delivered to the hydrogen storage system controller from the fuel-cell system controller.

The hydrogen storage system controller transmits a signal for stopping hydrogen charging, that is, the charging stop signal, to the charging-station side controller 30 via the communication means 21, and the charging-station side controller 30, upon receiving the charging stop signal from the vehicle via the communication means 31, stops charging the vehicle with hydrogen until the charging switch 11 has been turned on.

Hereinafter, a charging safety control process for a fuel-cell vehicle according to the present invention will be descried with reference to FIG. 2.

First, once the driver turns on the charging switch 11 by pressing or flipping the charging switch 11 to fill hydrogen in the hydrogen tank of the vehicle, the controller (e.g., the fuel-cell system controller and the hydrogen storage system controller) receives an on-manipulation signal of the charging switch 11. After the controller (e.g., the fuel-cell system controller) recognizes that the charging switch 11 is switched on, when the vehicle is currently stopped, (i.e., the controller receives the detection signal of the vehicle speed detector and determines that the vehicle speed is 0), then the controller switches off the ignition of the vehicle if the ignition of the vehicle is not already turned off, in steps S11, S12, and S16.

On the other hand, when the charging switch 11 is currently off, (e.g., when the driver has not turned on the charging switch 11 and the vehicle speed is 0 (that is, the vehicle is in a stop state)), then the controller 20 of the vehicle (e.g., the hydrogen storage system controller) transmits a charging stop signal to the charging-station side controller 30 via the communication means 21 so that even if the driver attempts fill the tank with hydrogen, the charging will not be allowed if charging switch has not been turned on, in steps S11, S13, and S14.

Thus, the charging-station side controller 30 controls whether or not the driver can begin hydrogen charging the tank, such that even if the driver tries to recharge the hydrogen in the tank while if the charging switch 11 has not been turned on, the charging safety control system according to the present invention prevents the driver from being able to initiate the charging when the charging switch 11 has not been manipulated to the on-state, thereby pursuing vehicle safety.

However, when the charging stop signal fails to be normally delivered to the charging-station side controller 30 from the vehicle side controller 20 due to an error or failure in communication between the vehicle-side controller 20 and the charging-station side controller 30, or when the charging-station side controller 30 is out of order, the vehicle may be abnormally charged with hydrogen. In this case, pressure in the hydrogen tank of the vehicle increases due to hydrogen charging, and the vehicle-side controller 20, upon sensing a pressure change which exceeds a reference value (e.g., 5 MPa) in the hydrogen tank according to a signal of from tank pressure detector 13, determines that abnormal hydrogen charging is in progress and automatically switches off the ignition of the vehicle in steps S15 and S16. Consequently, in exemplary embodiment of the present invention, in spite of abnormal hydrogen charging, can ensure a safe recharging environment by switching off the ignition of the vehicle.

Table 1 shows a summary of the foregoing description, in which a vehicle-side control state including ignition control prior to charging is shown.

TABLE 1

|  | Charging Switch On/Off | Vehicle Speed | Vehicle Control |
|---|---|---|---|
| Case 1 | On | 0 | Off Ignition |
| Case 2 | On | >0 | Ignore Switch Signal |
| Case 3 | Off | 0 | Transmit Charging Stop Signal |
| Case 4 | Off | >0 | Normal State |

Only when the driver switches off the charging switch 11 after charging is completed, the ignition of the vehicle may be switched off by the driver's ignition key manipulation (vehicle ignition-manipulation) in steps S17 and S18, and when the charging switch 11 is not manipulated to the off-state, that is, the on-state of the charging switch 11 is maintained, the switch-on of the ignition of the vehicle is prohibited in step S19.

Table 2 shows vehicle ignition control after charging, in which re-ignition is possible only after the charging switch 11 is switched off.

TABLE 2

|  | Charging Switch | Vehicle Speed | Vehicle Control |
|---|---|---|---|
| Case 1 | On | 0 | Prohibit Startup |
| Case 2 | Off | 0 | Allow Startup |

As such, in the present invention, a separate charging switch which is to be manipulated for hydrogen charging is installed in a vehicle, such that only after a driver manipulates the charging switch, hydrogen charging may be performed and the ignition of the vehicle is automatically switched off, thereby achieving safe hydrogen charging. Furthermore, when the driver does not manipulate the charging switch, hydrogen charging will not be allowed by the system, and even when abnormal hydrogen charging is made in spite of non-manipulation of the charging switch (due to, e.g., control station failure), the ignition of the vehicle is automatically switched off, thereby maintaining vehicle safety.

Consequently, in the charging safety control system and method for the fuel-cell vehicle according to the exemplary embodiment of the present invention, the charging switch which is subject to manipulation for hydrogen charging is provided in the fuel-cell vehicle, and when the vehicle is stopped and the charging switch is on, the ignition of the vehicle is automatically switched off, so that the vehicle safety in hydrogen charging is further improved.

While the embodiment of the present invention has been described in detail, the scope of the present invention is not limited thereto, and various changes and modifications made by those of ordinary skill in the art using the basic concept of the present invention defined in the appended claims are also included in the scope of the present invention.

[Description of Reference Numerals]

| | |
|---|---|
| 11: Charging Switch | 12: Vehicle Speed Detector |
| 13: Tank Pressure Detector | |
| 20: Controller (Vehicle Side) | 21: Communication Means (Vehicle Side) |
| 30: Controller (Charging-Station Side) | 31: Communication Means (Charging-Station Side) |

What is claimed is:

1. A charging safety control system for a fuel-cell vehicle, the charging safety control system comprising:
    a charging switch provided in the fuel-cell vehicle to be manipulated in hydrogen charging;
    a vehicle speed detector configured to detect a current vehicle speed; and
    a controller configured to receive a signal corresponding to on/off-manipulation of the charging switch and the current vehicle speed detected by the vehicle speed detector and control the ignition of the vehicle accordingly,
        wherein the controller is configured to switch off the ignition of the vehicle, upon receiving the on-manipulation signal from the charging switch, and upon determining that the vehicle is stopped based on the current vehicle speed detected by the vehicle speed detector.

2. The charging safety control system of claim 1, further comprising a communication means provided in the fuel-cell vehicle to achieve communication between the controller and a charging-station side controller,
    wherein the controller is configured to transmit a charging stop signal to the charging-station side controller via the communication means, when the controller of the fuel-cell vehicle determines from the current vehicle speed that the vehicle is stopped and the charging switch is still off.

3. The charging safety control system of claim 2, further comprising a tank pressure detector provided on the fuel-cell vehicle to detect a pressure of a hydrogen tank,
    wherein the controller of the fuel-cell vehicle is configured to switch off the ignition of the vehicle, when the controller, after transmitting the charging stop signal, determines from the pressure detected within the hydrogen tank that a pressure change exceeds a predetermined reference value.

4. The charging safety control system of claim 1, wherein the controller is configured to allow re-ignition of the vehicle according to vehicle ignition-manipulation of a driver upon receiving an off-manipulation signal from the charging switch after a vehicle ignition has been turned off while being stopped, and when the on-manipulation state of the charging switch is maintained, the controller prohibits the vehicle ignition from being turned back on.

5. A charging safety control method for a fuel-cell vehicle, the charging safety control method comprising:
    manipulating a charging switch to an on-state to charge a hydrogen tank with hydrogen in the fuel-cell vehicle; and
    receiving, by a controller, an on-manipulation signal of the charging switch and a detection signal from a vehicle speed detector detecting a current vehicle speed of the vehicle; and
    switching off, by the controller, the ignition of the vehicle in response to determining that the vehicle is currently stopped and an on-manipulation signal has been received.

6. The charging safety control method of claim 5, wherein the controller is configured to transmit a charging stop signal to a charging-station side controller via a communication means in the vehicle upon determining from the detection signal of the vehicle speed detector that the vehicle is currently is currently stopped and the charging switch is off.

7. The charging safety control method of claim 6, wherein the controller is configured to switch off the ignition of the vehicle, upon, after transmitting the charging stop signal, receiving a detection signal from a tank pressure detector detecting a pressure of the hydrogen tank and determining that pressure change within the hydrogen tank exceeds a predetermined reference value.

8. The charging safety control method of claim 5, wherein the controller is configured to allow re-ignition of the vehicle according to vehicle ignition-manipulation of a driver upon receiving an off-manipulation signal from the charging switch after a vehicle ignition has been turned off while being stopped, and when the on-manipulation state of the charging switch is maintained, the controller prohibits the vehicle ignition from being turned back on.

9. A non-transitory computer readable medium containing program instructions executed by a controller, the computer readable medium comprising:

program instructions that receive a signal corresponding to on/off-manipulation of a charging switch and a current vehicle speed detected by a vehicle speed detector and control the ignition of a vehicle based upon whether the charging switch is on and the current vehicle speed; and program instructions that switch off the ignition of the vehicle, upon receiving an on-manipulation signal from the charging switch, and upon determining that the vehicle is stopped based on the current vehicle speed detected by the vehicle speed detector.

10. The non-transitory computer readable medium of claim 9, further comprising program instructions that transmit a charging stop signal to a charging-station side controller via a communication means, when the controller determines from the current vehicle speed that the vehicle is stopped and the charging switch is still off.

11. The non-transitory computer readable medium of claim 10, further comprising program instructions that switch off the ignition of the vehicle, when the controller, after transmitting the charging stop signal, determines from a pressure detected within a hydrogen tank that a pressure change exceeds a predetermined reference value.

12. The charging safety control system of claim 9, further comprising program instructions that allow re-ignition of the vehicle according to vehicle ignition-manipulation by a driver upon receiving an off-manipulation signal from the charging switch after a vehicle ignition has been turned off while being stopped, and when the on-manipulation state of the charging switch is maintained, the controller prohibits the vehicle ignition from being turned back on.

* * * * *